United States Patent [19]

Wheeler et al.

[11] 4,280,354
[45] Jul. 28, 1981

[54] ACOUSTIC METHOD AND APPARATUS FOR MEASURING SURFACES OF WAFERS AND SIMILAR ARTICLES

[75] Inventors: William R. Wheeler, Saratoga; George J. Kren, Los Altos, both of Calif.

[73] Assignee: Tencor Instruments, Mountain View, Calif.

[21] Appl. No.: 120,932

[22] Filed: Feb. 12, 1980

[51] Int. Cl.³ .................................................. G01N 29/00
[52] U.S. Cl. ..................................... 73/1 DV; 73/105; 367/99
[58] Field of Search .............. 73/105, 1 DV, 1 J, 589, 73/633; 367/87, 99, 120, 125

[56] References Cited

U.S. PATENT DOCUMENTS

| | | | |
|---|---|---|---|
| 3,500,301 | 3/1970 | Meier | 367/99 |
| 4,175,441 | 11/1979 | Urbanek et al. | 73/599 |
| 4,206,633 | 6/1980 | McKechnie et al. | 73/105 |

*Primary Examiner*—Stephen A. Kreitman
*Attorney, Agent, or Firm*—Thomas Schneck

[57] ABSTRACT

A measurement system wherein an acoustic distance measuring transducer is moved over a flat reference surface, measuring the distance from the transducer to a calibration surface and then to a test surface. The transducer is moved along a path within a ring while the top edge of the ring is used to support the calibration surface and then the test surface. The ring is mounted for rotation so that the transducer can scan a supported surface at a locus of points. Scans across the calibration surface and then the test surface are compared to measure deviations of the test surface from calibration surface.

16 Claims, 15 Drawing Figures

ACOUSTIC METHOD AND APPARATUS FOR MEASURING SURFACES OF WAFERS AND SIMILAR ARTICLES

BACKGROUND OF THE INVENTION a. Field of the Invention

The invention relates to non-contacting measurement of surfaces, and in particular to a scanning acoustic measurement system for testing flatness of wafer surfaces and the like.

b. Prior Art

Previously, non-contacting measurements of flatness for wafers and similar articles have been made optically and capacitively. With respect to optical devices, reflective and interferometer devices are known. One reflective type employs a beam which is directed onto a test surface from a position perpendicular to the surface. Small deviations in flatness cause the beam to be reflected at an angle which is not perpendicular to the surface. By measuring the angle of reflection plus the duration and extent of the reflective deflection as the beam is moved along a straight line, the deviation from flatness may be computed.

In the interferometer instrument, fringes are created by means of splitting a beam of monochromatic light from a single source into two components of which one follows a path which includes a reflection on a test surface and the other follows a path which includes a reflection on a reference surface. The path length difference causes an optical fringe pattern to appear. Any deviation in flatness causes the number of fringes to change. By counting fringes, the deviation from flatness may be measured. A problem with optical methods is that specularly reflective surfaces are required.

Another apparatus for measuring flatness of a test surface is a capacitive gauge which consists of three spaced apart reference sensors, together with an array of similar sensors. The three reference sensors are used to capacitively determine the distance to a test surface. The plane defined by those three distances is a reference plane. The array of other sensors then measures the distance to the test surface and any deviations from the reference plane indicate deviations in flatness. A problem with capacitive measurement devices is that the test surface must be at least partially conductive.

In prior U.S. Pat. No. 4,175,441, K. Urbanek, G. Kren and W. Wheeler disclose an acoustic gauge for measuring distances to planar members and the thickness of flat sheets and the like.

While prior art devices make generally accurate measurements of flatness, in most instances the time for obtaining an accurate multi-point flatness appraisal of a test object is limited. This is because most devices measure either a single point at a time or a modest number of points simultaneously, except for the laser reflective apparatus. In the case of that instrument, the laser beam scans one line across the surface, but time must be taken to determine the extent of a slope, as indicated by a variance in the angle of reflection of the beam. In the case of the interference apparatus, an entire surface may be measured at a time, but interpreting the data by counting fringes and measuring spacing between fringes is tedious.

An object of the invention is to devise a non-contacting flatness gauge wherein a flatness profile based on a large number of sample points may be obtained in a relatively brief time interval.

SUMMARY OF THE INVENTION

The above object has been achieved by using a distance measuring transducer to compare the distance from a reference surface to a calibration surface whose shape is precisely known and then to a test surface having a shape similar to the calibration surface, but with deviations from the calibration surface to be measured. In particular if the calibration surface is flat, the flatness in the test surface can be measured by comparison.

A flatness measurement is carried out by first moving the distance measuring transducer across a flat reference surface on a known path. The transducer measures the perpendicular distance between the flat reference surface on which the transducer is moving and a calibration surface which is known to be flat and spaced apart from the reference surface by a fixed amount. The calibration surface is substantially parallel to the flat reference surface, being supported by three circumferentially spaced cantilever supports which locate a measurement plane. Distance measurements at a plurality of points along the path are recorded. Next, the calibration flat surface is removed and replaced in the measurement plane with a specimen surface of unknown topography whose flatness is to be measured. The transducer is again moved across the flat reference surface in the same known path as previously. Again, distance measurements are made along the path between the flat reference surface and the surface of unknown topography at the same points as previously. If the calibration surface and the surface of unknown topography are rotated while the transducer is moved in a straight line through the center of rotation, the points will be located on a spiral. The differences between the measured distances over the two scans represent deviations from the plane of the calibration surface. The spiral scans provide a relatively large number of points over the surface of an article whose flatness is to be measured.

An advantage of the present invention is that the flatness of an article to be tested may be measured over a large number of points in a relatively brief time. The article to be measured does not have to be specularly reflective or conductive; e.g. it could be a filter coated with antireflection coating.

DESCRIPTION OF THE PREFERRED EMBODIMENT

A. Overall Assembly Construction and Operation

Figure 1:
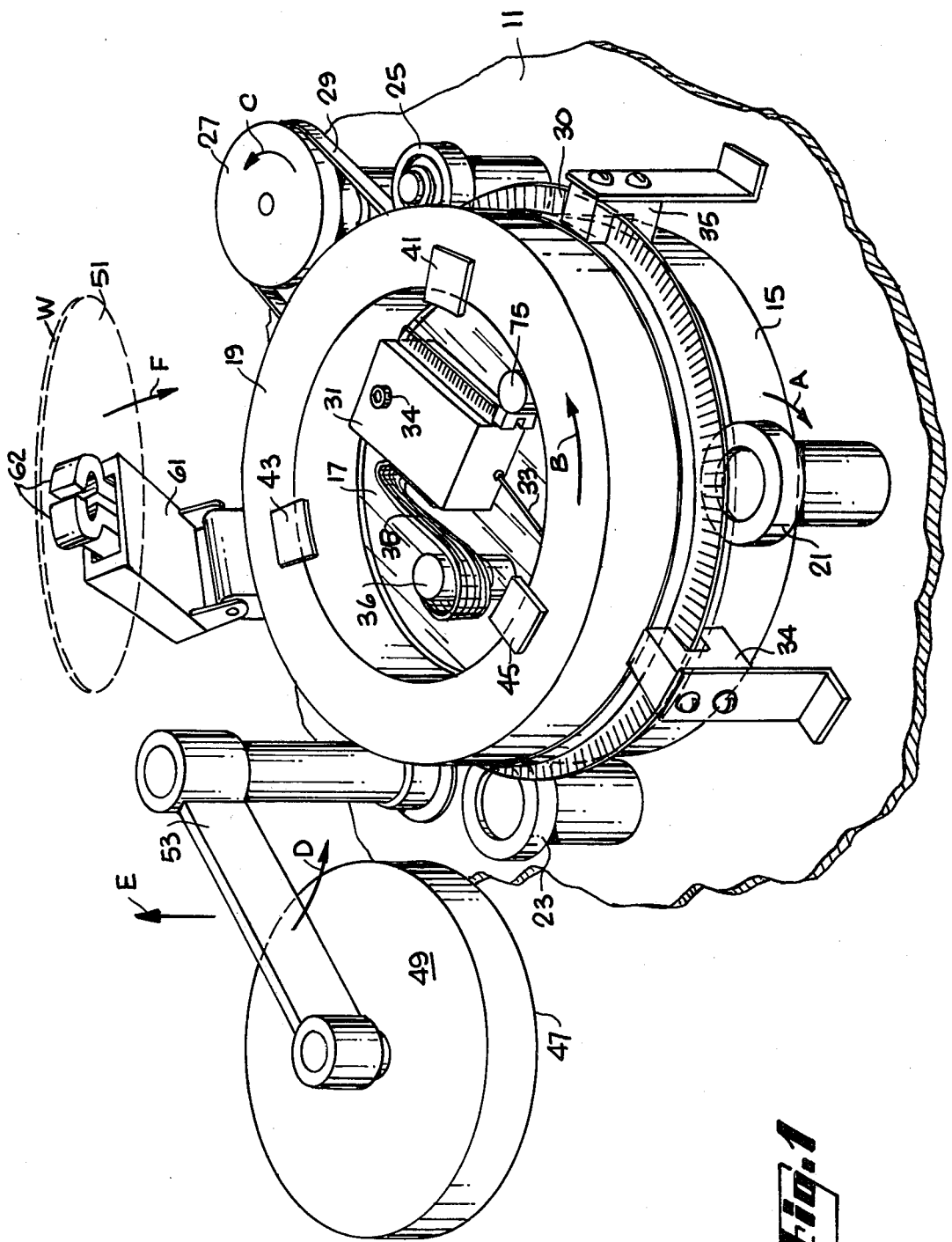
FIG. 1 is a perspective view of a mechanical assembly for supporting calibration and test articles for measurement.
Figure 2:
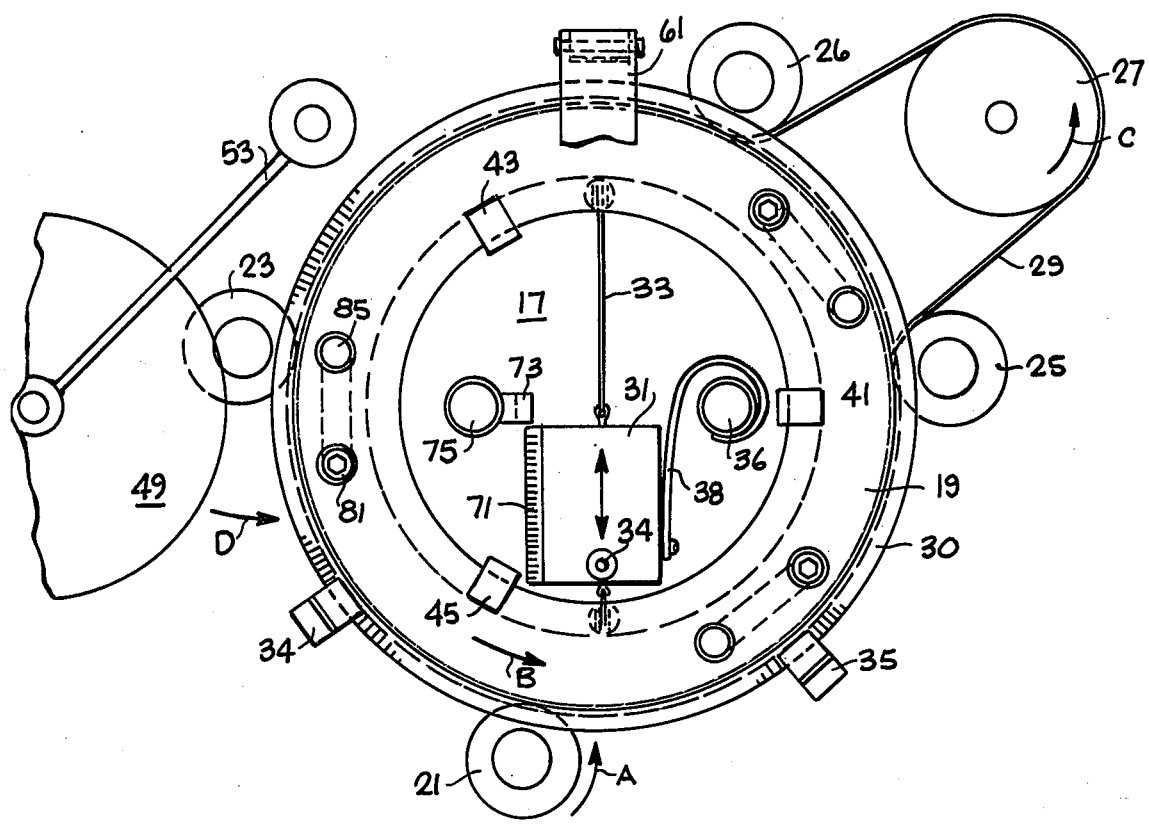
FIG. 2 is a partial top view of the assembly illustrated in FIG. 1.
Figure 3:
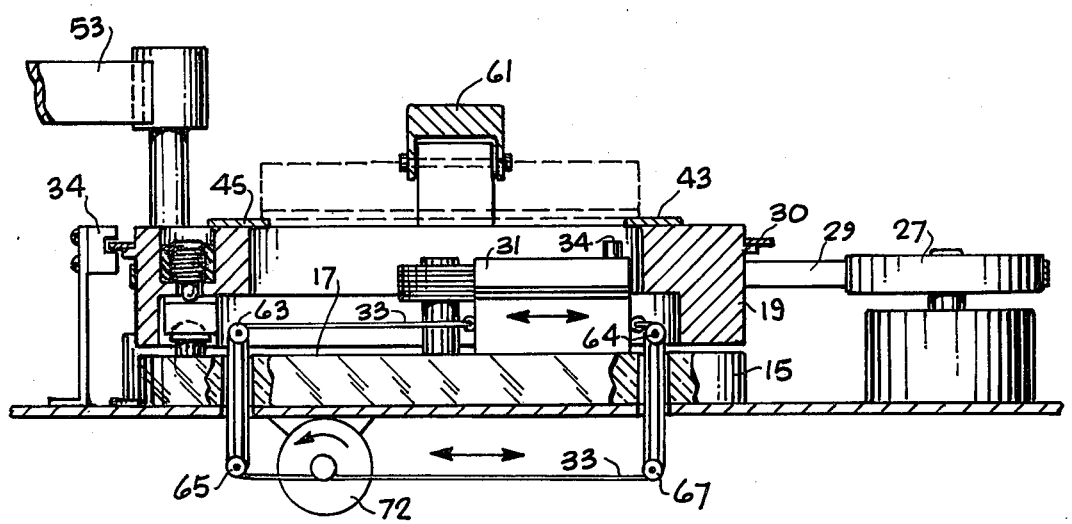
FIG. 3 is a partial side cutaway view of the assembly illustrated in FIG. 1.

With reference to FIGS. 1, 2 and 3, an assembly for carrying out the non-contacting flatness measurement of the present invention is illustrated. A table 11 is utilized as a support for the reference disk 15. The disk may be a metal, or glass solid disk which has flat opposite sides, parallel to table 11, with a lower side supported on table 11 by means of a few thin rubber pads. A precision flat reference surface 17 is ground on the upper side of reference disk 15. The purpose of the pads is to eliminate any stress from the reference surface which might distort its flatness. The upper reference surface 17 is an optical flat which is polished to within 0.05 of one wavelength of visible light.

An annular ring 19 is mounted above disk 15 by means of pads beneath the ring. These pads have a surface of low friction material, such as Teflon, a trademark of the DuPont Company for polytetrafluoroethylene. The ring is mounted for rotation at relatively low speed, such as 30 to 60 revolutions per minute. Free wheeling rollers 21, 23 an 25 are spaced about the periphery of ring 19 in order to keep it in place. The rollers 21, 23 an 25 rotate in the direction indicated by the arrows A when the ring 19 rotates in the direction of arrow B. Rotary motion is imparted to ring 19 by means of a motor which transfers rotary energy to ring 19 by means of pulley 27 and belt 29. The pulley 27 completely encircles ring 19 and rotates in the direction indicated by arrow C. Rotation of the pulley 27 causes rotation of the ring. The ring guides 21, 23, 25 and 26 maintain the position of the ring. Guides 21 and 23 prevent accidental damage to the belt.

A film disk 30 is an annular disk of photographic film having a large number, say 360, radial black and clear stripes spaced equally about the periphery thereof for indicating angular position of the ring. These stripes are read by the photodetectors 34 and 35, each of which contains a photodiode and a light emitting diode (LED) for transmitting light through the clear stripes of the film disk. As the disk rotates, black stripes block light from being transmitted to the LED and then a clear stripe once again re-establishes the light path. Hence, a series of pulses detected by the LED indicate disk rotation. The extent of rotation is indicated by the number of pulses. The disk may be indexed to a certain angular position by providing a unique striping pattern to indicate a rotational starting point and a rotational finishing point.

The upper surface of ring 19 has cantilever supports 41, 43 and 45 which may receive either a calibration flat surface 47 which is the under side of calibration glass disk 49 or a test surface 51 which is the side of interest of a semiconductor wafer W or a similar article. These three supports are equally spaced about the inside, top, circumferential perimeter of ring 19. The upper side of the three supports define the measurement plane occupied first by the calibration flat surface 47, then by the surface of a test article. Note that the measurement plane is substantially parallel to the reference surface 17, but not absolutely parallel. Absolute parallelism is not required because the measurement which is made compares the perpendicular distance between the reference surface and the calibration surface on the one hand and the reference surface and the test surface on the other hand. The calibration and test surfaces both occupy the measurement plane at different times while the measurement transducer samples the same test points on separate passes along the same path, as described below.

The calibration disk 49 is swung into place by the arm 53 which swings horizontally in the direction indicated by the arrow D and then can be lowered onto the support pads 41, 43 and 45 by means of downward motion. After a calibration measurement, the calibration surface may be raised by upward motion in the direction of the arrow E. The calibration disk is then removed by rotation in an arc opposite to the arrow C. A test article may be lowered onto the support pads 41, 43 and 45 by means of the arm 61. This arm rotates in a vertical arc downwardly, as indicated by the arrow F. Holding the wafer W is a vacuum chuck, not shown, a commercially available device which holds wafers by means of a vacuum. One supplier if vacuum chucks is Perkin Elmer Corporation. The chuck itself is held by fingers 62, at an end of arm 61.

A measurement transducer 31 is disposed to move across the flat upper reference surface 17. The transducer includes a gauge head 34 which is used for measuring the perpendicular distance between orifices in the head, described below, and the test surface in the measurement plane immediately above the transducer, the surface being supported by cantilever supports 41, 43, 45. The measurement transducer 31 is shown to be a box-like structure, but may have any convenient shape. The box structure is used to carry a miniature speaker and microphone for distance measurements. Electrical signals to and from the transducer 31 are carried by cable 38 to a post 36 which extends through reference surface 17 to outside control circuits.

With reference to FIG. 3, the driving mechanism for transducer 31 may be seen. The driving mechanism includes cable 33 which travels around pulleys 63, 65, 67 and 69. Rotational force is applied by a driving pulley 72 which is connected to a motor and around which the cable 33 is wrapped. Referring again to FIGS. 1 and 2, it may be seen that the transducer 31 carries a linear film strip 71 again containing a plurality of black and clear stripes which may be read by photodetector 73. The photodetector 73 is of the light transmission type previously described and as the transducer 31 is pulled by cable 33 the black stripes interrupt the beam transmitted by an LED to a photodiode. The film strip 71 indicates the position of the transducer 31 relative to the photodetector 73. Since the path of cable 33 is fixed, the path of the transducer 31 which is pulled by the cable is also fixed and the precise position and velocity of the cable may be detected by means of the film strip 71 as it passes through the photodetector 73. The photodetector 73 is mounted to a post 75 through which electrical signals are transmitted outside of the assembly.

The motor which drives pulley 72 and hence the transducer 31 is a stepping motor which is driven by pulses from the annular film disk 30. The motion of transducer 31 may be synchronized to rotation of film disk 30 and hence ring 19 in this manner. It is important that the transducer move along the same path for measurements of both the calibration surface measurement and the test surface measurement. For this reason accuracy is counting film disk stripes is important. It is also important to designate starting and stopping locations on the film disks of both the ring 19 and transducer 31.

Cable 33 is seen to pull transducer 31 across the reference surface 20 in a straight line. Transducer 31 has measurement orifices, described below with reference to FIGS. 6 and 7, in gauge head 34. The gauge orifices in gauge head 34 are positioned on one side of transducer 31 so that the orifices can travel from a point near the inside diameter of ring 19 to the center of the ring. The transducer orifices are formed by coaxial tubes, with a smaller tube defining an acoustic wave output orifice surrounded by a larger tube defining an acoustic wave input orifice. Both tubes are of equal length, projecting from transducer 31, approximately a few millimeters in a direction perpendicular to the reference surface 20. Distance is measured by phase changes in the acoustic impedance between the orifices. Operation of the transducer is explained more fully below with reference to FIGS. 6–10.

Figure 4:
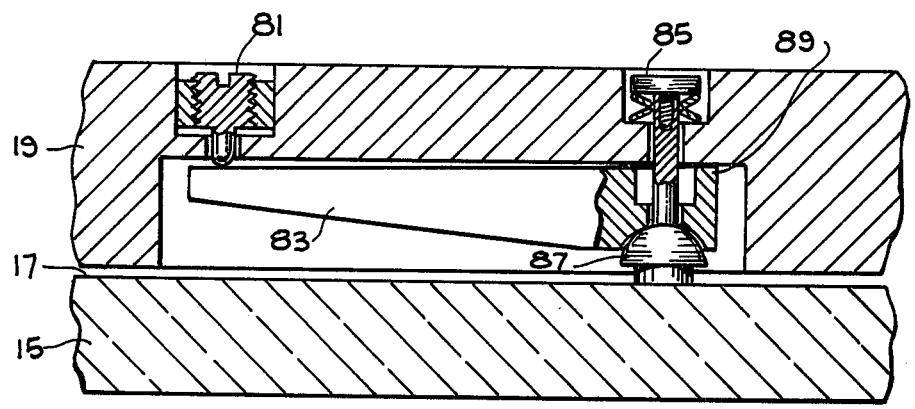
FIG. 4 is a side view of the assembly of FIG. 1, illustrating motion of an arm carrying an article for flatness measurement.

FIG. 4 shows a detail of a levelling foot for the ring 19. The ring contains several screw pins 81 which are mounted flush to the upper surface of the ring, as shown in FIG. 2. In order to obtain a magnification of screw action which will level the ring, a lever 83 is provided extending inwardly to the screw 85. The lever is pivoted by means of a fulcrum 87 at a lower corner of the lever. The upper corner 89 of the lever experts upward force on ring 19. By turning the screw 85, the elevation of fulcrum 87 may be adjusted. However screw pin 81 adjusts the height ring 19 relative to the flat reference surface 17. A slight turning of the screw pin 81 forces the lever 83 against fulcrum 87 and raises corner 89 against the ring 19, slightly raising a portion of the ring relative to a nearby portion of surface 17.

Figure 5:
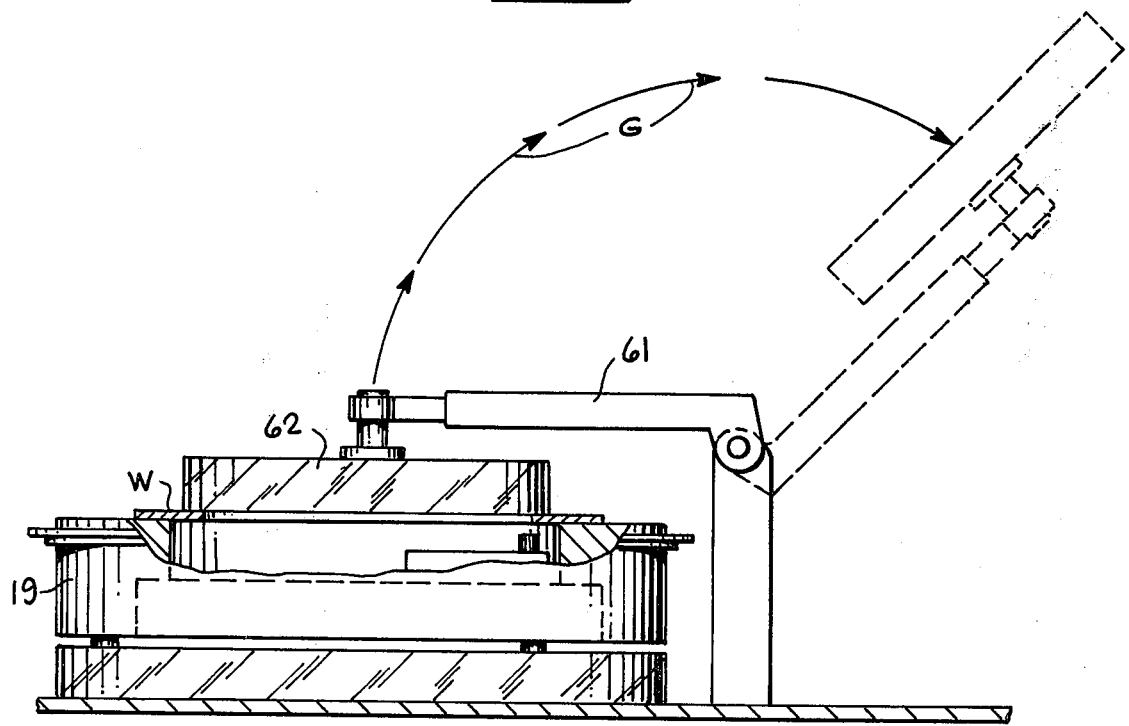
FIG. 5 is a side detail sectional view of a levelling mechanism for supporting a ring member of the assembly of FIG. 1.

With reference to FIG. 5, the extent of travel of the arm 61 may be viewed. The arm 61 carries a vacuum chuck 62 which, by means of suction, supports an article such as wafer W. The wafer is positioned over the flat upper surface of ring 19 as previously described. The arm 61 travels backward after a measurement in the direction indicated by the arrows G to the position indicated by the dashed line P. This position is one wherein an operator may easily remove a wafer and apply another one with full visibility of the operation. After a wafer is loaded the arm may be automatically swung back onto the top of ring 19.

In operation the measurement transducer 31 moves across and over the optically flat reference surface 17 in a known path while simultaneously measuring the relative perpendicular distance between the flat reference surface 17 and the parallel calibration flat surface 47 which is spaced apart from the reference surface 17 by the known thickness of the ring. As ring 19 is rotated, transducer 31 moves in a linear path, being synchronized to the motion of ring 19 by film disk 30. The gauge head 34 of transducer 31 moves from a point near the inner periphery of ring 19 to the center of the ring so that the locus of sample points on the calibration surface which are measured would form a spiral track if all the measurement points were connected together. In a typical measurement, it is desirable to take many sample points, perhaps as many as 100 to 300.

Once the measurement has been performed for the calibration flat reference surface, and the distance measurements stored, the calibration reference surface is replaced by a surface of a wafer or similar article having unknown surface topography. The measurement transducer 31 is then moved in the same path and the ring is rotated at the same speed and from the same starting position so that the same identical path is tracked for both the reference and the unknown surfaces. The new set of perpendicular distance readings is then compared by a computer with the readings made with the calibration flat surface. The deviations in the relative perpendicular unknown distance between surfaces at the same points in the two measurements represent deviations from the flat plane defined by the supports 41, 43 and 45, together with the flat surface of the calibration disk.

The size of ring 19 depends upon the size of wafers selected for measurement. Rings can be mounted to accommodate various size wafers. Alternatively, the same ring can be kept, but different vacuum chucks used to accommodate different wafers.

B. Transducer Construction and Operation

The transducer described herein with reference to FIGS. 6–10 is the subject of a separate patent application, Ser. No. 40,930 by G. Kren and F. Koenig, filed May 21, 1979.

Figure 6:
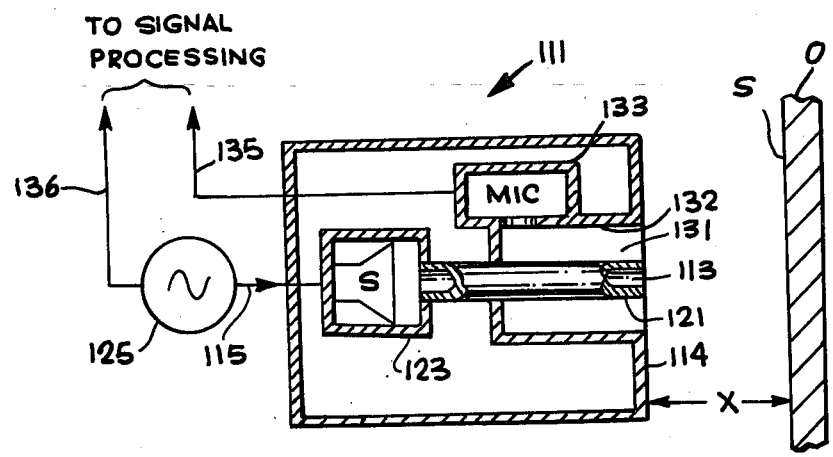
FIG. 6 is a plan view of a portion of an acoustic distance measurement transducer used in the assembly shown in FIGS. 1-3.

With reference to FIG. 6, a plan view of a gauge head used in the transducer 31 of the present invention is shown. The head is preferably cylindrical having two orifices 113, 131. In the preferred embodiment, the orifices are formed at the open ends of coaxial tubes which project a few millimeters from the transducer body which carries the speaker and microphone. The dimensions for the transducer selected by a user should be large enough to accommodate the components of FIG. 6 described below.

The first orifice 113 is an acoustic wave modulation output located at the end of a conduit or tube 121 which extends from the orifice 113 to a miniature speaker 123. Miniature speaker 123 is a commercially available device measuring approximately 10 mm on a side and approximately 4 mm thick. The speaker is commercially known as a receiver, model BB-1511 available from Knowles Electronics, Inc., Franklin Park, Ill. Speaker 123 is electrically driven by a low power solid state audio oscillator 125 which is connected to speaker 123 by means of a wire pair 115. The frequency of audio oscillator 125 is not critical, but a frequency below 20,000 Hertz is preferred. The exact frequency selected should be one which yields an optimum signal to noise ratio for the entire system, taking into account the sensitivity of an acoustic pickup transducer described below. Orifice 113 is parallel to, but spaced from, a planar surfaces, of an object, O, such as a substrate. Typically, the substrate may be supported by a block or table, not shown.

Figure 7:
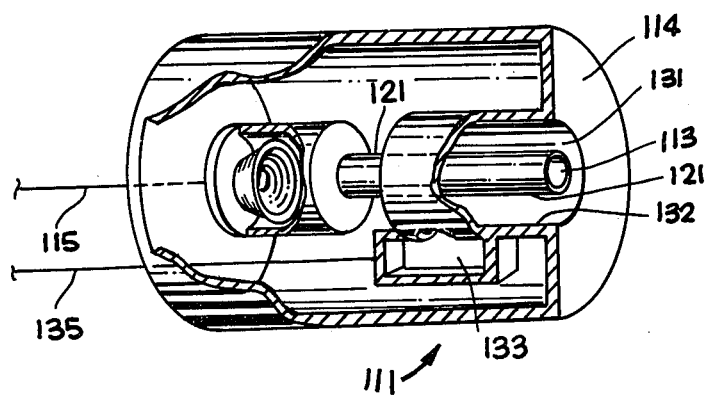
FIG. 7 is a perspective view of the transducer shown in FIG. 6.

The gauge head 34 preferably has a face 114 which is an annular panel or wall surrounding and supporting the free end of the larger diameter coaxial tube within which the orifices 113, 131 are defined. In FIGS. 6 and 7 annular face 114 has the orifices 113, 131 coaxially in the center thereof. Exemplary gauge dimensions are as follows. Head 111 is made cylindrical with a face diameter of 6.4 mm, a first orifice 113 diameter of 0.9 mm surrounded by conduit 121 having a diameter of 1.3 mm. Second orifice 131 coaxially surrounds first orifice 113 and has a diameter of 1.6 mm. These dimensions may be varied by those skilled in the art and are not critical.

Second orifice 131 is an acoustic wave input which communicates with the sensitive portion of a microphone 133 through a conduit or tube 132. Microphone 133 is approximately the same size as speaker 123. Such a microminiature microphone is also available from the same supplier mentioned above and has a commercial designation of BA 1502. A pair of wires 135 emerging from microphone 133 is connected to signal processing means described below with reference to FIG. 8.

In operation, the audio oscillator 125 generates a sinusoidal electrical signal having a frequency below 20 kHz and preferably about 1,000 Hz. Frequency is not critical but frequency of oscillations must remain constant during a distance measurement. The electrical signal is transformed into sinusoidal acoustic waves by speaker 123. Acoustic energy is transmitted down conduit 121 to orifice 113. The surface S should be reflective of acoustic waves and non-vibrating so that phase shifts due to acoustic impedance may be measured. The gauge head must be very close, but not touching the surface S; for example, a gap spacing between the gauge head face 114 and surface S may be approximately 50 micrometers, as indicated by the letter "X."

The phase shift of waves interacting with the acoustic impedance zone between the test surface and the gauge head is detected through the second orifice 131 which communicates with microphone 133. Acoustic waves subjected to acoustic impedance are detected by the microphone 133. In contradistinction to the prior art, the present apparatus is not measuring the amplitude of reflected waves, nor the time of arrival of pulse echos, nor interference effects.

The acoustic waves which are transmitted to the surface S have a wavelength which is very long compared to the gap spacing, X. For example, for a 1,000 Hz acoustic wave in air at one atmosphere pressure, at 0° C., the velocity of sound is 331.7 meters per second. This means that one wavelength would be 33.17 cm or 331,700 microns. A preferred gap spacing between the face of the gauge head and the surface S of object O is approximately 50 micrometers. The acoustic path length is therefore approximately 100 microns. Thus, the acoustical path for reflected waves is less than 0.05% of one wavelength. While it may appear impractical to measure distances between a gauge head and the surface of an object which is placed so close to the gauge head, measurements of flatness can be ideally performed with such proximity. In flatness measurements, small variations in distance are the object of the measurement. The present invention is directed to measuring distances, and variations in distances, of approximately 0.1 micrometer and less and for this purpose, such close spacing is preferred.

The importance of close spacing is twofold. External noise is eliminated, but more importantly, a zone of relatively high acoustic impedance is formed between the acoustic wave orifices and surface S. Acoustic pressure generated by the first orifice works against this acoustic impedance. This zone of high acoustic impedance is believed to cause the phase shifts detected in the present invention. Thus, the spacing of the gauge head must be close enough to surface S to allow acoustic impedances causing linear phase shifts to be formed.

FIG. 7 shows a side view of the gauge head of FIG. 6. The head 111 may be seen to be cylindrical with the first orifice 113 located coaxially within the annular second orifice 131. The first orifice need not be within the second orifice, but may be in a side-by-side relationship or other adjacent location, such that a high acoustic impedance path between the orifices and the surface S may be formed. The relative positions of the first and second orifices may be reversed.

The coaxial geometry of FIG. 7 is preferred because the annular second orifice 131 provides a large aperture for receiving reflected energy while limiting the size of the overall gauge head. Tube 132 which defines second orifice 131 may be part of the gauge head body, such as an inside diameter or may be a separate tube mounted in the gauge head. It is desirable to keep the conduit 121 short in order to avoid any unwanted acoustic impedances. Similarly, the microphone 133 communicates directly with the orifice 131 through tube 132 in order to limit the loss of acoustical signal between the orifice and the microphone. Although tube 121 and tube 132 are shown to be straight in FIGS. 6 and 7, there may be bends in the tubes so that the speaker and microphone can be located at convenient locations within transducer 31.

Figure 8:
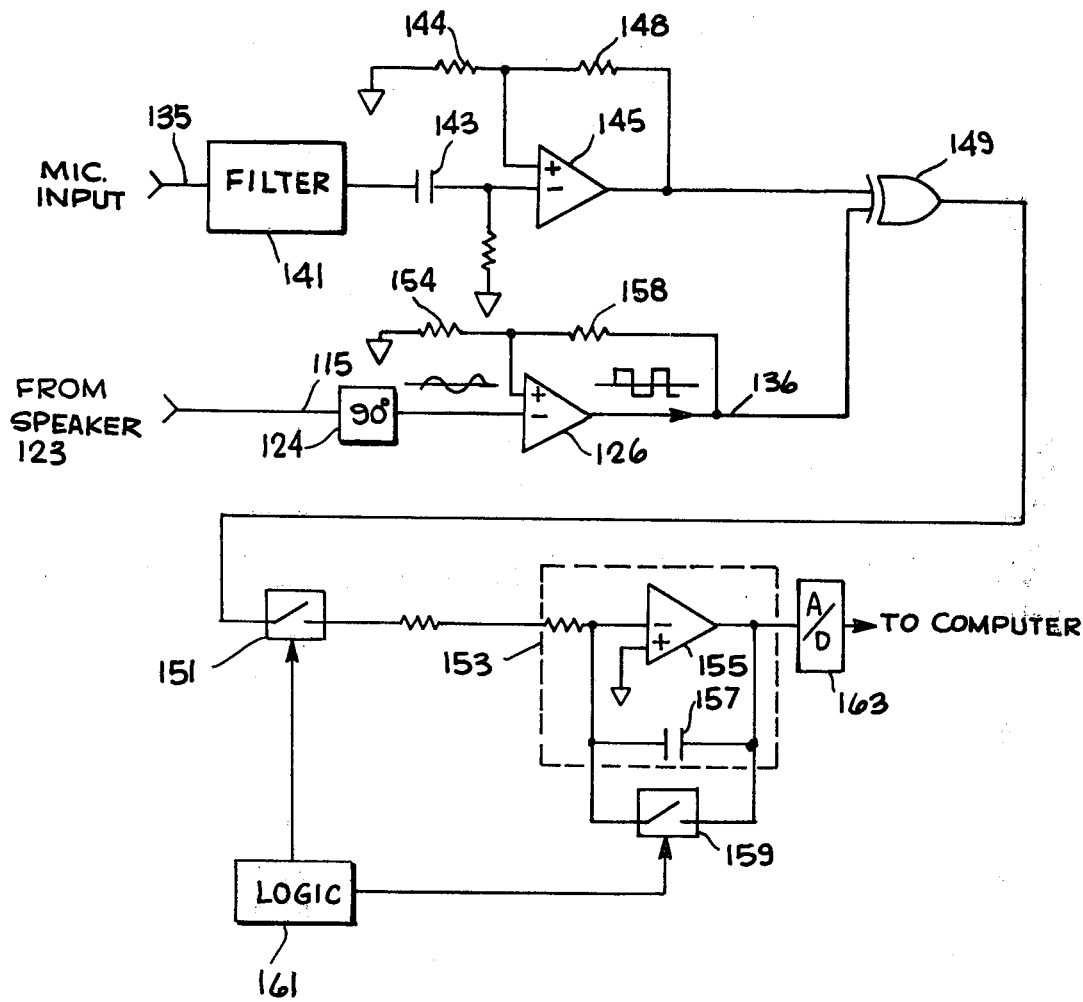
FIG. 8 is a simplified electrical schematic for the signal processing circuit used with the acoustic transducer of FIGS. 6 and 7.
Figure 9:
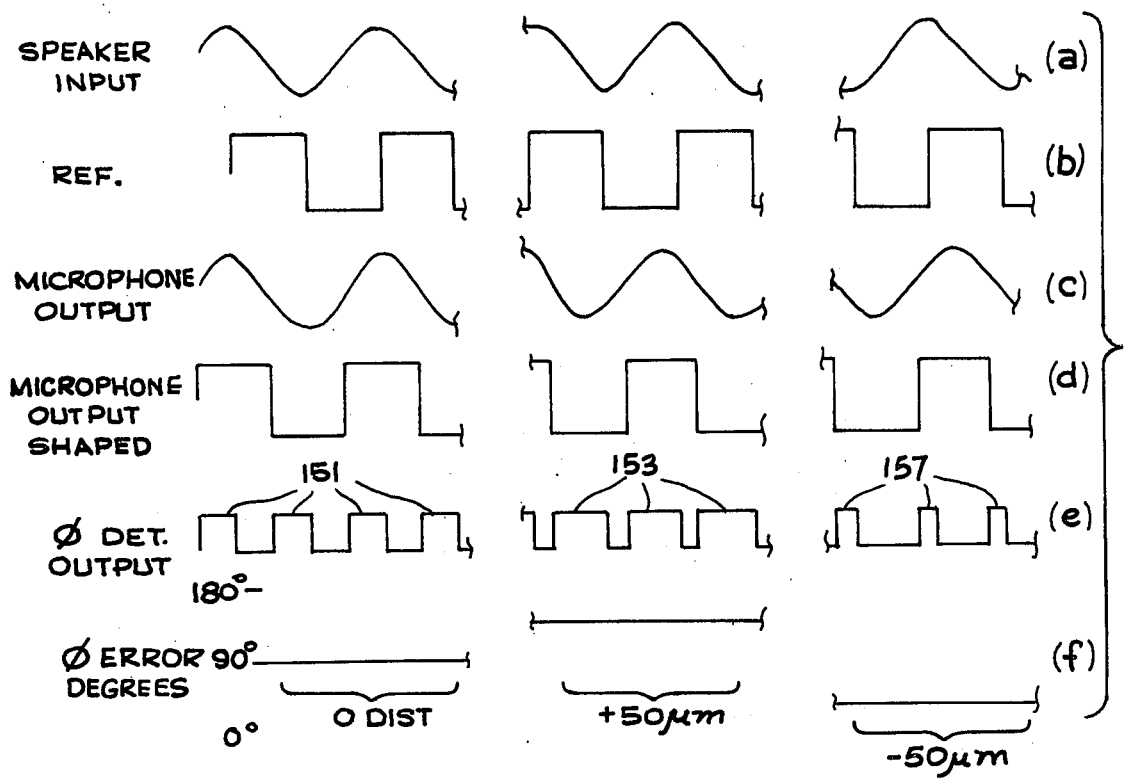
FIGS. 9(a)-(f) are waveforms illustrating operation of the acoustic transducer of FIGS. 6-8.

FIG. 8 shows signal processing circuits for the transducer. The output of microphone 133, taken along wires 135 forms a microphone input to filter 141 which has a relatively narrow pass band centered at the frequency of oscillator 125. The filter output is fed through capacitor 143 to the negative input of comparator 145 which produces square waves as the filter output voltage travels above and below ground. The square wave output of comparator 145 is fed to the EXCLUSIVE-OR gate 149, which serves as a phase detector. Part of the output from comparator 145, is fed back to the input through resistor dividers 148 and 144 which provides an anti-bounce characteristic known as hysteresis. The amount opf hysteresis should be minimal to reduce sensitivity to amplitude changes.

The phase detector 149 receives a second input from comparator 126 along wire 136. Comparator 126 forms a square wave from the 90° shifted sine wave output transmitted from oscillator 125. A phase shift network 124 provides the 90° shift to the sine wave input. Resistor dividers 154 and 158 provide hysteresis to comparator 126. The sine wave output of oscillator 125 in FIG. 6 drives speaker 123 with the speaker input waveform being shown in FIG. 9(a). The square wave reference waveform which is shifted in phase by 90° is illustrated in FIG. 9(b). FIG. 9(c) illustrates the waveform which is reflected from the surface S and which becomes the ouput of microphone 133. This reflected wave is shaped by comparator 145 to have a square wave output as illustrated in FIG. 9(d). The phase detector 149 receives the shaped reflected wave of FIG. 9(d) along wire 148 and the reference waveform illustrated in FIG. 4(b) along wire 136 from oscillator 125. The output waveform of the phase detector 149 is shown in FIG. 4(e) wherein the output pulses have a pulse width which is proportional to the phase error between the speaker input and the reflected wave. For example, the first four pulses of FIG. 9(e), labeled 151 have a 50% duty cycle indicating a 90° shift between the reference waveform of FIG. 9(b) relative to the reflected wave of FIG. 9(d). The next four pulses, labeled 153, have an increased duty cycle indicative of a 180° phase shift error, as shown in FIG. 9(f).

The pulses 157 are narrower in width than pulses 153 and represent a lesser duty cycle indicative of a phase error of 0°. This is also pictured in FIG. 9(f). A 90° phase error corresponds to a distance from the gauge head to the measurement plane. The phase errors between 0° and 180° represent positive and negative changes in distance relative to that reference position. The present invention therefore does not measure distance in the absolute sense, but changes in distance relative to a reference position which is known, i.e. the measurement plane where the calibration surface is placed.

In operation, the distance between the gauge head face and a surface to be measured would be established at a reference distance of about 50 microns apart. Then, as the transducer moved relative to the surface S the changes in distance to the surface from the gauge, relative to the original reference distance could be measured.

Rather than base the measurement on a single phase error signal, the output of the phase detector is integrated by selecting a number of sample waveforms. In FIG. 8, the output of phase detector 149 is transmitted through switch 151 to an integrator which is indicated by the dashed line 153. Integrator 153 comprises an operational amplifier 155 with a capacitor 157 connected across it. A switch 159 is used to reset the integrator after an integration. A logic circuit 161 is used to count a predetermined number of pulses through switch 151 which determines the sampling interval, and then resets the integrator 153 by means of switch 159. For example, it may be desirable to integrate over 30 phase error pulses to obtain a statistically reliable phase error sample signal. This puse count number is preset in logic 161 which then counts pulses through switch 151 and after the preset number of pulses has passed through the switch, opens switch 151 thereby stopping further pulses from entering capacitor 157 and resets integrator 153 by closing switch 159. After the integrator has beeen reset, switch 151 is closed for the next measurement. The output of integrator 153 is transmitted to an analog-to-digital converter 163 so that the integrated output signal may be processed by a computer.

Figure 10:
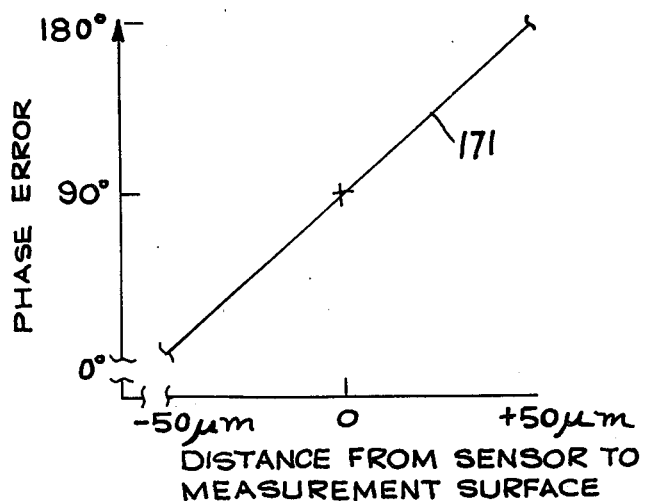
FIG. 10 is a plot of measurement distance versus phase error using the acoustic transducer of FIGS. 6-8.

The integrated phase shift output of the circuit of FIG. 8 is plotted against relative distance from a reference in FIG. 10. The mid point of the abscissa is the zero reference distance, i.e. in the measurement plane while positive and negative distances, in micrometers, are shown to the right and left of the zero point. The pase error in degrees is plotted as the ordinate, extending from 0° upwards to 180°. Over this range, there is an unamibgious linear relationship between phase error and distance. It will be noted that in the lower left hand corner of the plot the linear relationship, expressed by the generally straight line 171 is broken. This indicates that beyond the broken line 171, the relationship between phase error and distance is not necessarily linear. Similarly, in the upper right hand corner of FIG. 10 the line 171 is also broken. Again, the relationship between phase shift and distance beyond the point indicated may not be linear. If the shape of the curve is known, a plot, similar to FIG. 10 may be stored in a digital computer and phase relationships may be correlated with distance in accord with the shape of the curve. However, we have discovered a linear relationship which is particularly easy to deal with, but this linear relationship exists for the transducer of FIGS. 6 and 7 for very limited distances and only when the transducer is spaced very close to the surface of the object being measured.

If the rnage of the transducer is extended, or if a different type of transducer is used, for example the type described in U.S. Pat. No. 4,175,441 then surfaces other than flat surfaces may be tested. For example, if the calibration surface were a precision spherical surface, then the test surface could be tested for deviatons from a spherical surface, even though the test surface were not itself spherical. The test surface might be parabolic or even aspheric. Both the calibration and test surfaces should be positioned with their axes of symmetry, or optical axes, corresponding to the center of ring 19. In accord with the present invention, the test surface is compared to the calibration surface.

What is claimed is:

1. A method of measurement of surfaces comprising, providing a flat reference surface, moving a distance measuring transducer across the flat reference surface on a known path while simultaneously measuring with said transducer the relative perpendicular reference distance between the transducer and a calibration surface of known topography spaced apart from the flat reference surface by a fixed amount, replacing the calibration surface with a test surface of unknown topography but similar in topography to said calibration surface, moving the distance transducer across the flat reference surface in the same known path as previously while simultaneously measuring with said transducer the relative perpendicular unknown distance between the transducer and the surface of unknown topography, comparing the relative perpendicular reference distance to the perpendicular unknown distance over the path taken by the transducer, whereby deviations in the relative perpendicular unknown distance from the relative perpendicular reference distance represent deviations in topography in the test surface relative to the calibration surface.

2. A method of testing for flatness in surfaces comprising, providing a flat reference surface, moving a distance measuring transducer across the flat reference surface on a known path while simultaneously measuring with said transducer the relative perpendicular reference distance between the transducer and a calibration flat surface spaced apart from the flat reference surface by a fixed amount, replacing the calibration surface with a test surface of unknown topography but having a surface approaching a flat, moving the distance transducer across the flat reference surface in the same known path as previously while simultaneously measuring with said transducer the relative perpendicular unknown distance between the transducer and the surface of unknown topography, comparing the relative perpendicular reference distance to the perpendicular unkown distance over the path taken by the transducer, whereby deviations in the relative perpendicular unknown distance from the relative perpendicular reference distance represent deviations in flatness in the test surface relative to the calibration surface.

3. The method of claim 2 wherein measuring of relative distances is achieved by making a plurality of discrete measurements at a fixed number of sample points in said path.

4. The method of claim 2 wherein measuring of relative distances is achieved by simultaneously emitting and detecting acoustic waves from said transducer.

5. The method of claim 2 further defined by fixing the position of said first flat referencce surface and rotating the other surfaces about a central point in a plane parallel to the first flat reference surface while moving said distance transducer in a straight line terminating at said central point whereby the relative motion between the transducer and the other surface is a spiral.

6. A gauge assembly for use in measuring surfaces comprising,
 a ring mounted on a flat reference surface,
 a transducer mounted for movement on said reference surface along a known path within said ring, said transducer having means for measuring relative distance to an object spaced from said flat reference surface,
 means for bringing a calibration surface over the reference surface atop said ring,
 means for bringing a test surface over the reference surface atop said ring, whereby said transducer can make relative distance measurements along said path between the transducer on the one hand and either the calibration surface or the test surface on the other hand so that said distances can be compared to determine deviations of the test surface relative to the calibration.

7. The gauge of claim 6 wherein said ring has means for moving said transducer along a linear path.

8. The gauge of claim 7 wherein said ring has means for rotation whereby said transducer scans a spiral track with reference to an article atop said ring as said transducer moves along said linear path during ring rotation.

9. The gauge of claim 6 wherein said ring has an annular disk associated with the outer periphery of said ring, said disk having radial stripes, alternately opaque and transmissive to light, said ring and disk being movable with respect to fixed position optical stripe detectors, said detectors having means for signalling relative disk position.

10. The gauge of claim 6 wherein said means for bringing a test surface over the reference surface comprising a first arm having a holder at an end thereof, said first arm pivoted for rotation in an arc having a plane perpendicular to said reference surface.

11. The gauge of claim 6 wherein said means for bringing a calibration surface over the reference surface comprising a second arm having a reference surface holder at an end thereof, said second arm pivoted for rotation in an arc having a plane parallel to said reference surface.

12. The gauge of claim 6 wherein said transducer has a pair of tubes for simultaneously emitting and detecting acoustic waves.

13. The gauge of claim 12 wherein said tubes are aligned perpendicular to said reference surface.

14. The gauge of claim 6 wherein said transducer carries a strip of stripes, alternately opaque and transmissive to light, said strip movable with respect to a second fixed position optical stripe detector, said second detector having means for signalling relative transducer position.

15. The gauge of claim 6 wherein said reference surface is an optical flat.

16. The gauge of claim 6 wherein said calibration surface is an optical flat.

* * * * *